US008810690B2

(12) United States Patent
Yoon et al.

(10) Patent No.: US 8,810,690 B2
(45) Date of Patent: Aug. 19, 2014

(54) METHOD OF CONTROLLING DIGITAL PHOTOGRAPHING APPARATUS AND DIGITAL PHOTOGRAPHING APPARATUS USING THE SAME

(75) Inventors: Ji-young Yoon, Seongnam-si (KR); Ho-woung Lee, Seongnam-si (KR); Byoung-soo Kim, Kyeongsangnam-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1070 days.

(21) Appl. No.: 10/899,491

(22) Filed: Jul. 26, 2004

(65) Prior Publication Data

US 2005/0174447 A1 Aug. 11, 2005

(30) Foreign Application Priority Data

Feb. 7, 2004 (KR) ........................ 10-2004-0008184

(51) Int. Cl.
*H04N 5/76* (2006.01)
(52) U.S. Cl.
USPC ................... 348/231.99; 348/231.4; 386/322; 386/325
(58) Field of Classification Search
USPC ........ 348/231.2, 222.1, 231.99, 231.6, 231.1, 348/231.3, 231.4, 231.7
See application file for complete search history.

(56) References Cited

U.S. PATENT DOCUMENTS

| | | | | |
|---|---|---|---|---|
| 5,065,246 A | * | 11/1991 | Takemoto et al. | 348/354 |
| 6,014,135 A | * | 1/2000 | Fernandes | 715/744 |
| 6,081,350 A | * | 6/2000 | Aizawa et al. | 358/468 |
| 6,389,223 B1 | * | 5/2002 | Aotake | 386/109 |
| 6,411,771 B1 | | 6/2002 | Aotake | |
| 6,714,724 B1 | * | 3/2004 | Cook | 386/117 |
| 6,782,193 B1 | | 8/2004 | Nakatani et al. | |
| 6,801,707 B1 | | 10/2004 | Harumoto et al. | |

(Continued)

FOREIGN PATENT DOCUMENTS

| | | |
|---|---|---|
| JP | 09-311699 A | 12/1997 |
| JP | 11-32301 A | 2/1999 |

(Continued)

OTHER PUBLICATIONS

Office Action established for JP2004-299775.

(Continued)

*Primary Examiner* — Paul Berardesca
(74) *Attorney, Agent, or Firm* — Drinker Biddle & Reath LLP

(57) ABSTRACT

Provided is a method of controlling a digital photographing apparatus recording moving image data being input to a recording medium in a moving image photographing mode. The method includes creating a moving image file in the recording medium and storing the moving image data being input in the moving image file when a first signal is generated by a first button of the digital photographing apparatus pressed by a user, stopping storing of the moving image data being input when the first signal is generated by a second button of the digital photographing apparatus pressed by the user, continuing to store the moving image data being input in the moving image file when a second signal is generated by the second button pressed by the user, and stopping storing of the moving image data being input and completing the moving image file when the second signal is generated by the first button pressed by the user.

21 Claims, 12 Drawing Sheets

(56) References Cited

U.S. PATENT DOCUMENTS

| | | | |
|---|---|---|---|
| 2001/0043277 A1* | 11/2001 | Tanaka et al. | 348/333.01 |
| 2001/0048472 A1* | 12/2001 | Inoue et al. | 348/207 |
| 2002/0031335 A1* | 3/2002 | Iwasaki et al. | 386/70 |
| 2002/0093571 A1 | 7/2002 | Hyodo | |
| 2002/0118285 A1* | 8/2002 | Misawa et al. | 348/208.16 |
| 2002/0140826 A1* | 10/2002 | Sato et al. | 348/222.1 |
| 2004/0120689 A1* | 6/2004 | Yamasaki | 386/46 |

FOREIGN PATENT DOCUMENTS

| | | |
|---|---|---|
| JP | 11-297050 A | 10/1999 |
| JP | 11-331689 A | 11/1999 |
| JP | 11-341407 A | 12/1999 |
| JP | 2001-111934 A | 4/2001 |
| JP | 2001-160945 A | 6/2001 |
| JP | 2001-160968 A | 6/2001 |
| JP | 2001-195807 A | 7/2001 |
| JP | 2002-218384 A | 8/2002 |
| JP | 2002-223377 A | 8/2002 |
| JP | 2003-158706 A | 5/2003 |
| JP | 2003-299007 A | 10/2003 |
| JP | 2003-333521 A | 11/2003 |
| JP | 2004-015690 A | 1/2004 |
| JP | 2005-191756 A | 7/2007 |

OTHER PUBLICATIONS

Office Action issued for JP 2012-056852 (Apr. 8, 2014).

* cited by examiner

METHOD OF CONTROLLING DIGITAL PHOTOGRAPHING APPARATUS AND DIGITAL PHOTOGRAPHING APPARATUS USING THE SAME

This application claims the priority of Korean Patent Application No. 2004-8184, filed on Feb. 7, 2004, in the Korean Intellectual Property Office, the disclosure of which is incorporated herein in its entirety by reference.

BACKGROUND OF THE INVENTION

1. Field of the Invention

The present invention relates to a method of controlling a digital photographing apparatus and a digital photographing apparatus using the same, and more particularly, to a method of controlling a digital photographing apparatus storing moving image data recorded on a recording medium in a moving image photographing mode and a digital photographing apparatus using the same.

2. Description of the Related Art

Conventional digital photographing apparatuses, for example, the digital cameras disclosed in Japanese Patent Laid-open Publication Nos. 331,689 titled "Digital camera" and 223,377 titled "Digital camera and a method of controlling the same," set an operating condition at a user's choice in a setting mode, display an input image on a display panel in a preview mode, record image data on a recording medium in a photographing mode, and display images of the image data stored on the recording medium on the display panel.

In a moving image photographing mode, a conventional digital photographing apparatus operates as follows. When a user presses a button, such as a shutter release button, on a conventional digital photographing apparatus, a moving image file is created in a recording medium, and any moving image data that is being input is processed and stored in the moving image file. When the user presses the shutter release button again, the moving image data that is being input stops being stored, and the moving image file is completed. This operation is frequently performed in a moving image photographing mode. In other words, when the user presses the shutter release button again, another moving image file is created. Then, the moving image data being input is processed and stored in the moving image file. When the user presses the shutter release button again, the moving image data being input stops being stored, and the moving image file is completed.

According to the method of controlling the conventional digital photographing apparatus, whenever a user presses a button for photographing moving images, a moving image file is created. Therefore, it is not possible for the user to consecutively reproduce moving images photographed at different times.

SUMMARY OF THE INVENTION

The present invention provides a method of controlling a digital photographing apparatus and a digital photographing apparatus using the same, which can consecutively reproduce moving image data photographed at different times at a user's choice.

According to an aspect of the present invention, there is provided a method of controlling a digital photographing apparatus recording moving image data being input to a recording medium in a moving image photographing mode. The method includes creating a moving image file in the recording medium and storing the moving image data being input in the moving image file when a first signal is generated by a first button of the digital photographing apparatus pressed by a user, stopping storing the moving image data being input when the first signal is generated by a second button of the digital photographing apparatus pressed by the user, continuing to store the moving image data being input in the moving image file when a second signal is generated by the second button pressed by the user, and stopping storing the moving image data being input and completing the moving image file when the second signal is generated by the first button pressed by the user.

In the method of controlling the digital photographing apparatus according to the present invention, signals generated by the second button are additionally used. Therefore, the moving images is divided into different time frames at a user's choice can be stored in the same moving image file. Accordingly, the moving images photographed at different times can be consecutively reproduced.

According to another aspect of the present invention, there is provided a digital photographing apparatus using the above method.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Figure 1:
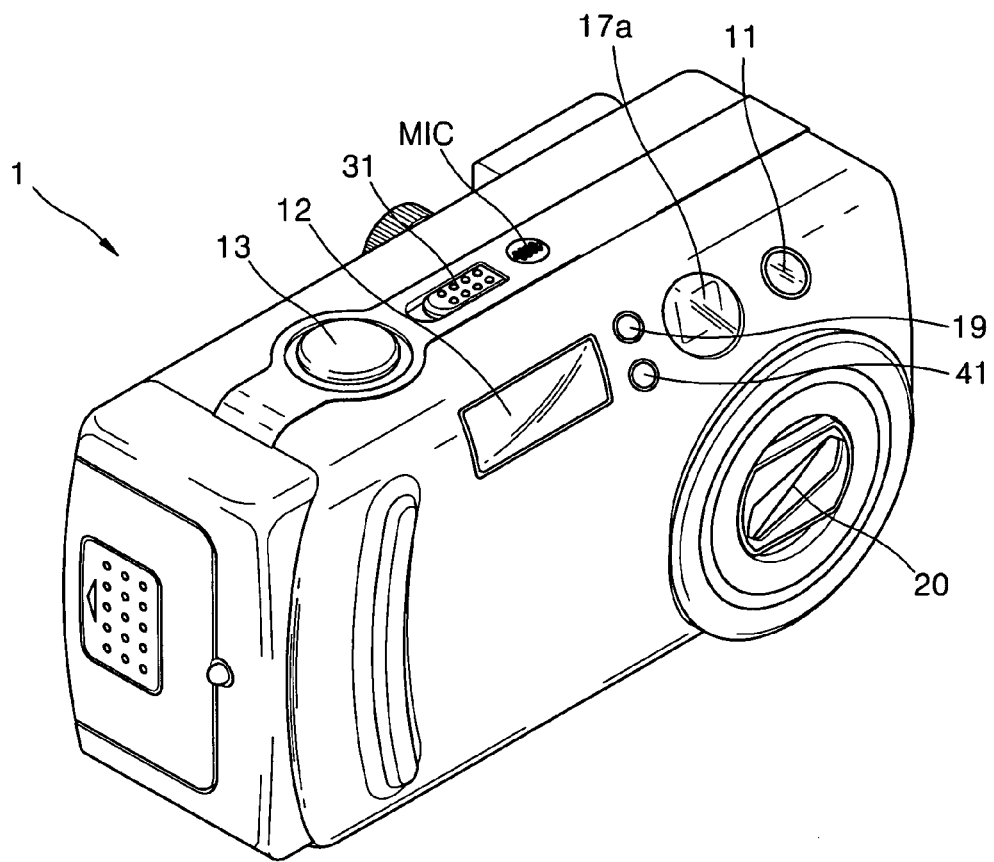
FIG. 1 is a perspective view showing a digital photographing apparatus according to the present invention.

Referring to FIG. 1, the front part of a digital photographing apparatus 1 according to the present invention includes a microphone MIC, a self-timer lamp 11, a flash 12, a shutter release button 13, a viewfinder 17a, a flash light intensity sensor 19, a power switch 31, a lens unit 20, and a remote receiver 41.

In a self-timer mode, the self-timer lamp 11 operates for a set period of time from when the shutter release button 13 is pressed to when an image starts to be captured. When the flash 12 operates, the flash light intensity sensor 19 senses the intensity of light generated by the flash 12 and inputs the sensed intensity of the light to a digital signal processor (DSP)

Figure 3:
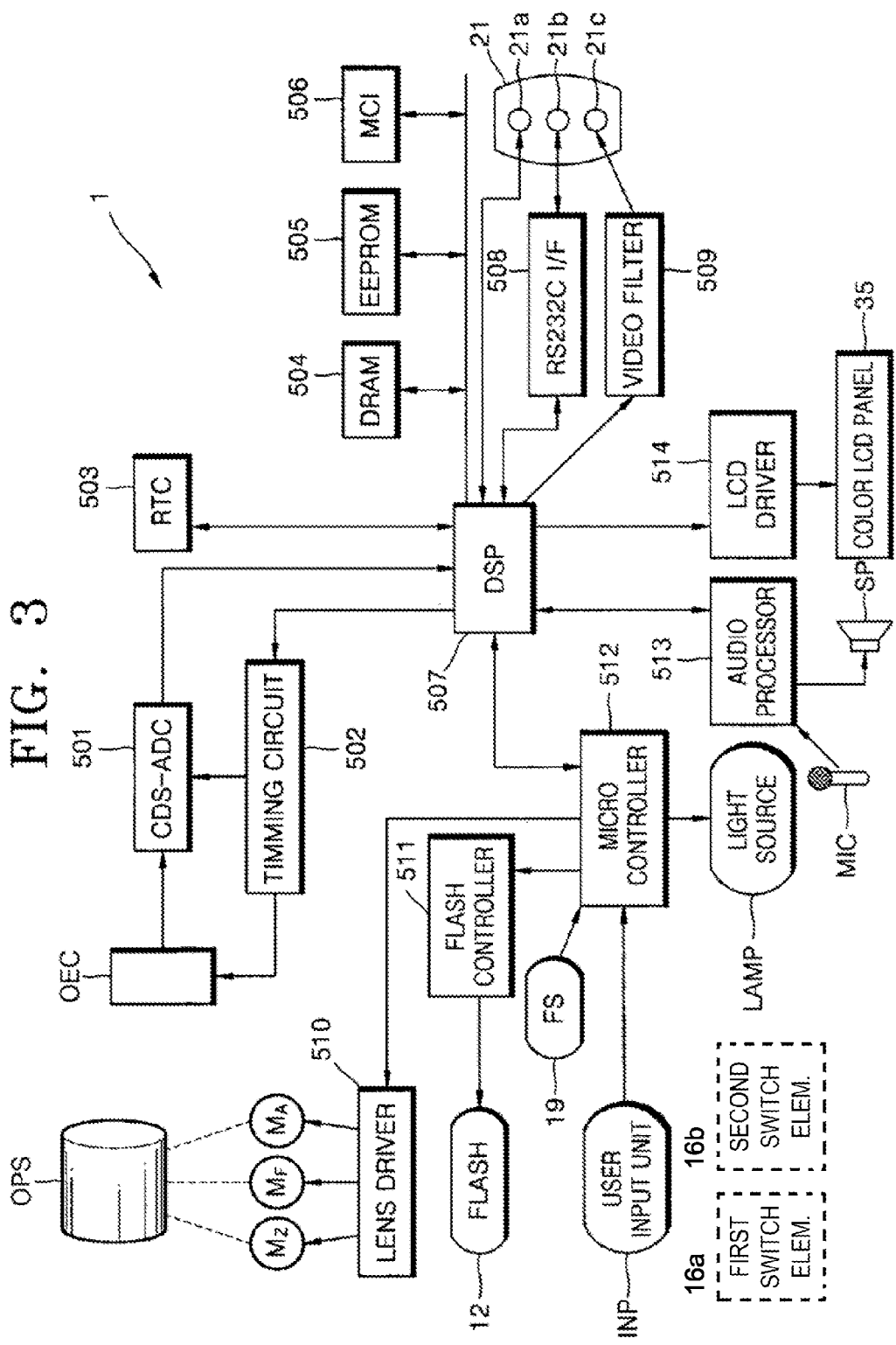
FIG. 3 shows the entire configuration of the digital photographing apparatus of FIG. 1.

507 of FIG. 3 via a micro controller 512 of FIG. 3. The remote receiver 41 receives a command signal, for example, a photographing command signal and inputs the photographing command signal to the micro controller 512.

The shutter release button 13 has two levels. In other words, referring to FIGS. 5 and 11, after operating a wide angle-zoom button $39_W$ and a telephoto-zoom button $39_T$, when a user presses the shutter release button 13 to a first level, a first level signal S1 from the shutter release button 13 is turned on. When the user presses the shutter release button 13 to a second level, a second level signal S2 from the shutter release button 13 is turned on.

Figure 2:
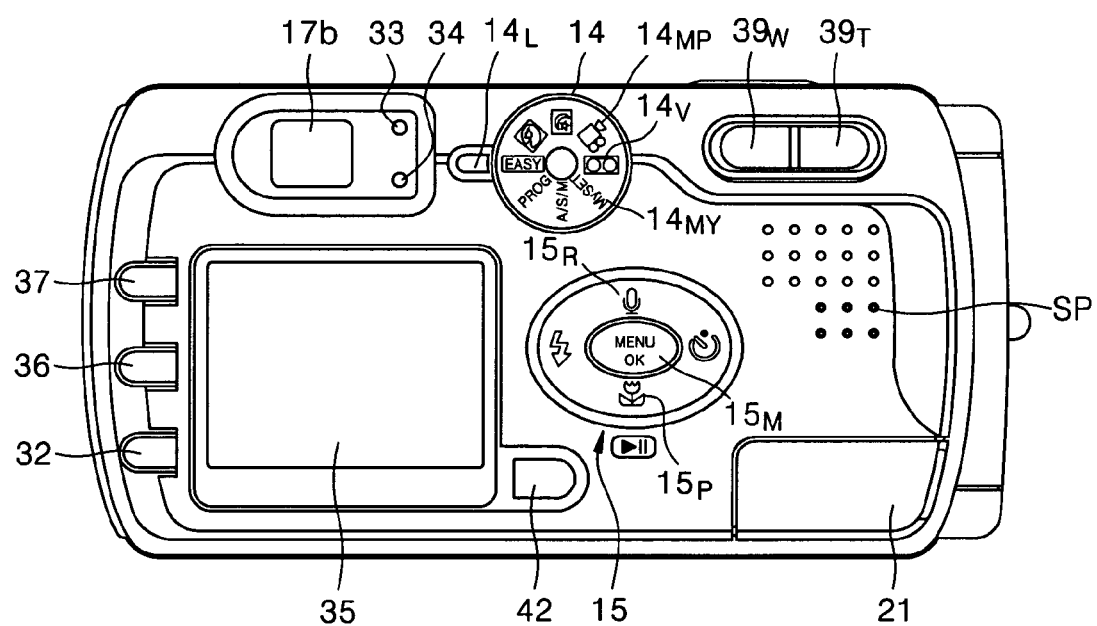
FIG. 2 is a back view showing the back of the digital photographing apparatus of FIG. 1.

Referring to FIG. 2, the back of the digital camera 1 according to the present invention includes a mode dial 14, functional buttons 15, a manual focusing/deleting button 36, a manual adjusting/reproducing button 37, a reproducing mode button 42, a speaker SP, a monitor button 32, an automatic focusing lamp 33, a viewfinder 17b, a flash standby lamp 34, a color LCD panel 35, the wide angle-zoom button $39_W$, the telephoto-zoom button $39_T$, and an external interface unit 21.

The mode dial 14 is used for selecting any one of the operating modes of the digital camera 1 such as a simple photographing mode, a program photographing mode, a character photographing mode, a night view photographing mode, a manual photographing mode, a moving image photographing mode $14_{MP}$, a user setting mode $14_{MY}$, and a recording mode $14_V$.

After selecting the moving image photographing mode $14_{MP}$, when a user presses the shutter release button 13, a moving image file is created in a memory card, i.e., a recording medium, and moving image data that is being input is stored in the moving image file. When the user presses a macro/move down/stop-continue button $15_P$ out of the functional buttons 15, the moving image data that is being input stops being stored. When the user presses the macro/move/stop-continue button $15_P$ again, the moving image data being input continues to be stored in the moving image file. When the user presses the shutter release button 13 again, the moving image data being input stops being stored, and the moving image file is completed. Since all of the moving image data photographed at different times are stored in the same moving image file, moving images in different time frames can be consecutively reproduced. The moving image photographing mode $14_{MP}$ will later be described in detail with reference to FIGS. 4 through 9.

The user setting mode $14_{MY}$ indicates an operating mode for setting photographing information needed for a still image mode or a moving image photographing mode. The recording mode $14_V$ is an operating mode for recording only sounds, such as a user's voice. After selecting the recording mode $14_V$, when a user presses the shutter release button, an audio file is created in the memory card and sounds being input are stored in the audio file. When the user presses a macro/move down/stop-continue button $15_P$ that is one of the functional buttons 15, audio data being input stops being stored. When the user presses the macro/move/stop-continue button $15_P$ again, the audio data being input continues to be stored in the audio file. When the user presses the shutter release button 13 again, the audio data being input stops being stored, and the audio file is completed. Since all of the audio data recorded at different times can be stored in the same audio file, sounds in different time frames can be consecutively reproduced.

The functional buttons 15 are used for operating specific functions of the digital camera 1. The functional buttons 15 are also used as direction-movement buttons for an active cursor on the menu screen of the color LCD panel 35. For example, in the still mode or moving image photographing mode $14_{MP}$, a user may set automatic proximity focusing by pressing the macro/move down/stop-continue button $15_P$. When the user presses the macro/move-down/stop-continue button $15_P$ while viewing a menu that sets a condition within an operating mode (the menu being displayed after pressing a menu/select-confirm button $15_M$), the activated cursor is moved down. The functionality of the macro/move down/stop-continue button $15_P$ in the moving image photographing mode $14_{MP}$ or in the recording mode $14_V$ is as described above.

When a user presses a voice-memo/move-up button $15_R$, a 10 second recording is possible upon consecutive photographing. When the user presses the voice-memo/move up button $15_R$ while viewing a menu for setting a condition for an operating mode (the menu being displayed after pressing the menu/select-confirm button $15_M$), the activated cursor is moved up. If the user presses the menu/select-confirm button $15_M$ when the active cursor is on a selection item, an operation corresponding to the selection item is performed.

The manual focusing/deleting button 36 is used for manual focusing or deletion by the user in a photographing mode. The manual adjusting/reproducing button 37 is used for manual adjustment of specified conditions and for stopping or reproducing in a reproducing mode. The reproducing mode button 42 is used for converting to a reproducing or preview mode.

The monitor button 32 is used for controlling the operation of the color LCD panel 35. For example, in the photographing mode, when the user presses the monitor button 32, an image of a subject and photographing information are displayed on the color LCD panel 35. When the user presses the monitor button 32 again, the power applied to the color LCD panel 35 is cut off. In the reproducing mode, when the user presses the monitor button 32 while an image file is being reproduced, photographing information about the image file being reproduced is displayed on the color LCD panel 35. When the user presses the monitor button 32 again, only pure images are displayed.

The automatic focusing lamp 33 operates when a focus is well adjusted. The flash standby lamp 34 operates when the flash 12 of FIG. 1 is in a standby mode. A mode indicating lamp $14_L$ indicates a selection mode of the mode dial 14.

FIG. 3 shows the entire configuration of the digital camera of FIG. 1. The entire configuration and operation of the digital camera 1 of FIG. 1 will now be described with reference to FIGS. 1 through 3.

An optical system (OPS) includes the lens unit 20 and a filter unit and optically processes light. The lens unit 20 of the OPS includes a zoom lens, a focus lens, and a compensation lens.

When the user presses the wide angle-zoom button $39_W$ or the telephoto-zoom button $39_T$ included in a user input unit (INP), a signal corresponding to the wide angle-zoom button $39_W$ or the telephoto-zoom button $39_T$ is input to the micro controller 512. The micro controller 512 controls a lens driver 510, thereby running a zoom motor $M_Z$, which, in turn, moves the zoom lens. In other words, when the user presses the wide angle-zoom button $39_W$, a focal length of the zoom lens becomes short, thereby widening an angle of view. When the user presses the telephoto-zoom button $39_T$, the focal length of the zoom lens becomes long, thereby narrowing the angle of view. Because the position of the focus lens is adjusted in a state where the position of the zoom lens is set, the angle of view is hardly affected by the position of the focus lens.

In the automatic focusing mode, a main controller built into the DSP 507 controls the lens driver 510 through the micro controller 512, thereby driving a focus motor $M_F$. Accordingly, the focus lens is moved, and, in this process, the position of the focus lens having the largest high frequency component of an image signal is set. This position may, for example, correlate to a certain number of driving steps of the focus motor $M_F$.

The compensation lens in the lens unit 20 of the OPS is not separately operated because the compensation lens compensates for an entire refractive index. A reference numeral $M_A$ indicates a motor for driving an aperture (not shown).

An optical low pass filter included in the filter unit of the OPS eliminates optical noises of a high frequency component. An infrared cut filter included in the filter unit of the OPS blocks an infrared component of incident light.

A photoelectric conversion unit (OEC) of a charge coupled device or a complementary metal oxide semiconductor converts light from the OPS into an electrical analog signal. Here, the DSP 507 controls a timing circuit 502 to control the operations of the OEC and a correlation double sampler and analog-to digital converter (CDS-ADC) 501, which is an analog-digital converter. The CDS-ADC 501 processes an analog signal from the OEC, eliminates high frequency noises, adjusts amplitude, and then converts the analog signal into a digital signal.

A real time clock (RTC) 503 provides time information to the DSP 507. The DSP 507 processes the digital signal from the CDS-ADC 501 and generates a digital image signal classified into a luminance signal and a chromaticity signal.

A light source (LAMP) is operated by the micro controller 512 in response to a control signal generated by the DSP 507 including the main controller. The light source (LAMP) includes the self-timer lamp 11, the automatic focusing lamp 33, the mode indicating lamp $14_L$, and the flash standby lamp 34. The INP includes the shutter release button 13, the mode dial 14, the functional buttons 15, the monitor button 32, the manual focusing/deleting button 36, the manual adjusting/reproducing button 37, the wide angle-zoom button $39_W$, and the telephoto-zoom button $39_T$.

A dynamic random access memory (DRAM) 504 temporarily stores a digital image signal from the DSP 507. An electrically erasable and programmable read only memory (EEPROM) 507 stores algorithm and setting data. A user's memory card is inserted or removed in a memory card interface 506. The digital image signal from the DSP 507 is input to a LCD driver 514, thereby displaying an image on the color LCD panel 35.

The digital image signal from the DSP 507 can be transmitted as serial communications via a universal serial bus connector 21a or a RS232C interface 508 and RS232C connector 21b. The digital image signal from the DSP 507 can also be transmitted via a video filter 509 and a video output unit 21c as a video signal. Here, the DSP 507 includes the main controller.

An audio processor 513 outputs a voice signal from the microphone MIC through the DSP 507 or the speaker SP. In addition, the audio processor 513 outputs an audio signal from the DSP 507 through the speaker SP. The micro controller 512 controls the operation of a flash controller 511 in response to a signal from the flash light intensity sensor 19, thereby driving the flash 12.

A main algorithm of the DSP 507 of FIG. 3 will now be described with reference to FIGS. 1 through 4.

Figure 10:
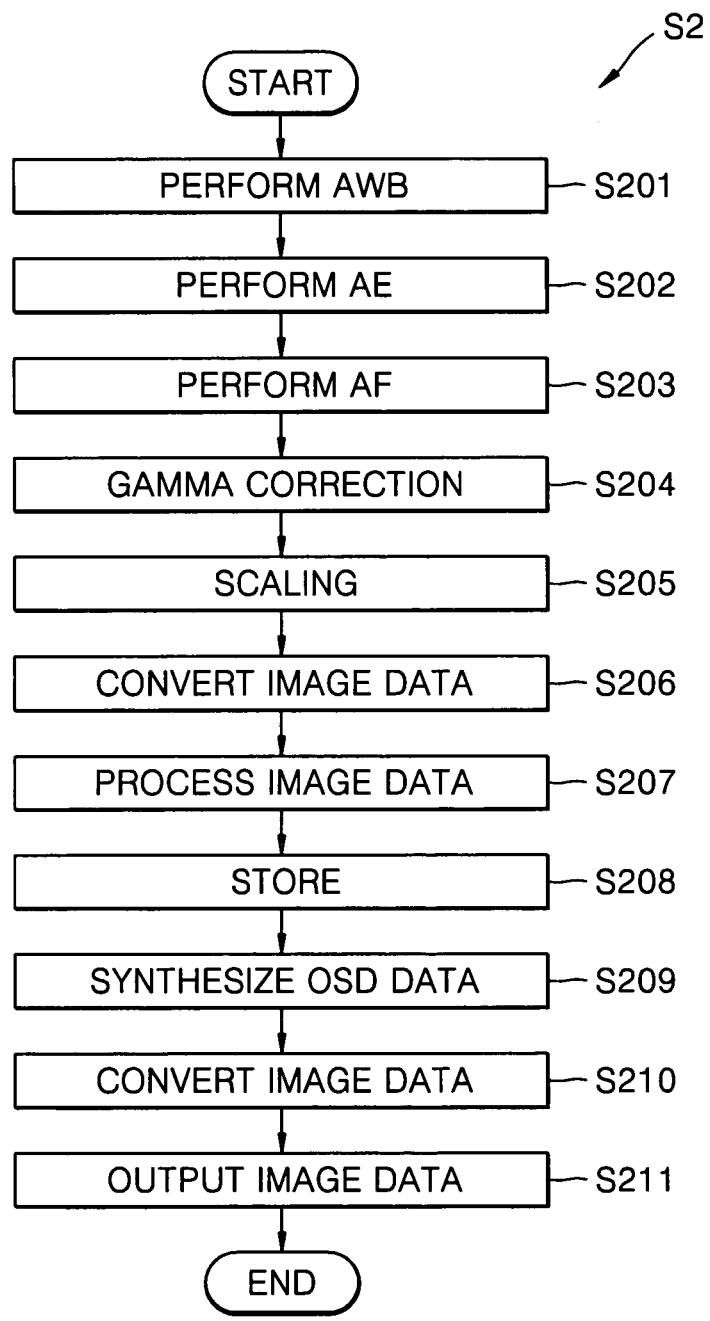
FIG. 10 is a flow chart illustrating an algorithm of performing a preview mode of FIG. 4.

When power is applied to the digital photographing apparatus 1, the DSP 507 is initialized (Step S1). After the initialization (Step S1), the DSP 507 performs a preview mode (Step S2). In the preview mode, an image input is displayed on the display panel 35. An operation related to the preview mode will later be described in detail with reference to FIG. 10.

The DSP 507 identifies a present operating mode (Step S3). Hereinafter, a description of the recording mode will be omitted. The DSP 507 performs the still image photographing mode or the moving image photographing mode depending on the present operation mode (Steps S41 or S42). The algorithm of performing the still image photographing mode (Step S41) will be described with reference to FIG. 11. The algorithm of performing the moving image photographing mode (Step S42) will be described with reference to FIGS. 5 through 9.

Of input signals generated by the INP, when signals corresponding to a setting mode are input (Step S5), the setting mode for setting an operating condition in response to the input signals from the INP is performed (Step S6). When a termination signal is not generated, the DSP 507 continues to perform the following steps (Step S7).

When a signal is generated by the reproducing mode button 42 in the INP, a reproducing mode (Step S4) is performed (Step S9). In the reproducing mode, operating conditions are set in response to the input signals from the INP, and reproducing is performed. When a signal is generated by the reproducing mode button 42 again (Step S10), the above steps are re-performed.

The algorithm of performing the moving image photographing mode (Step S42) of FIG. 4 will now be described with reference to FIGS. 1 through 3 and FIG. 5.

The DSP 507 inspects a remaining capacity of the memory card (Step S4201) and determines whether the memory card has a capacity for recording digital moving image data (Step S4202). When the memory card does not have enough recordable capacity, the DSP 507 indicates a lack of capacity of the memory card (Step S4203). When the memory card has enough recordable capacity, the following steps are performed.

The DSP 507 sets a white balance according to a present photographing condition, and parameters related to the white balance (Step S4204). In an automatic exposure mode (Step S4205), the DSP 507 calculates the exposure to incident luminance, drives the aperture driving motor $M_A$ according to the calculated exposure, and sets a shutter speed (Step S4206). In an automatic focusing mode (Step S4207), the DSP 507 performs automatic focusing and drives the focus lens (Step S4208).

When the first level signal S1 from the shutter release button 13 is on (Step S4209), the DSP continues to perform the following steps.

The DSP 507 identifies whether the second level signal S2 is on (Step S4210). When the second level signal S2 is not on, it means that the user did not press the shutter release button 13 to the second level to take a photograph. Therefore, the DSP 507 repeats Steps 4205 through 4210. When the second level signal S2 is on, it means that the user pressed the shutter release button 13 to the second level. Therefore, the DSP 507 creates one moving image file in the memory card (Step S4211). The DSP 507 compresses moving image data from the CDS-ADC 501 using the compressing algorithm of a motion picture experts group (MPEG) or a motion joint photographic experts group (MJPEG) and stores the compressed moving image data in the moving image file (Step S4212).

As described above, in this process of compressing the moving image data and storing it in the moving image file, when a stop-continue signal is not generated by the macro/move-down/stop-continue button $15_P$, and both the first level signal S1 and the second level signal S2 from the shutter release button 13 are on, the DSP 507 stops storing the moving image data being input and completes the moving image file (Steps S4213, S4218, S4219, and S4220).

However, when the stop-continue signal is generated by the macro/move-down/stop-continue button $15_P$ (Step S4213), the DSP 507 stops storing the moving image data (Step S4214). While storing is stopped, when the stop-continue signal is generated again from the macro/move-down/stop-continue button $15_P$ (Step S4215), the DSP 507 re-performs Step S4212. In addition, when both the first level signal S1 and the second level signal S2 from the shutter release button 13 are on, the DSP 507 stops storing the moving image data being input and completes the moving image file (Steps S4216, S4217, and S4220).

A first switch element 16a may pause storing time-variant digital information and a second switch element 16b may continue storing the time-variant digital information in the same digital information file.

Figure 5:
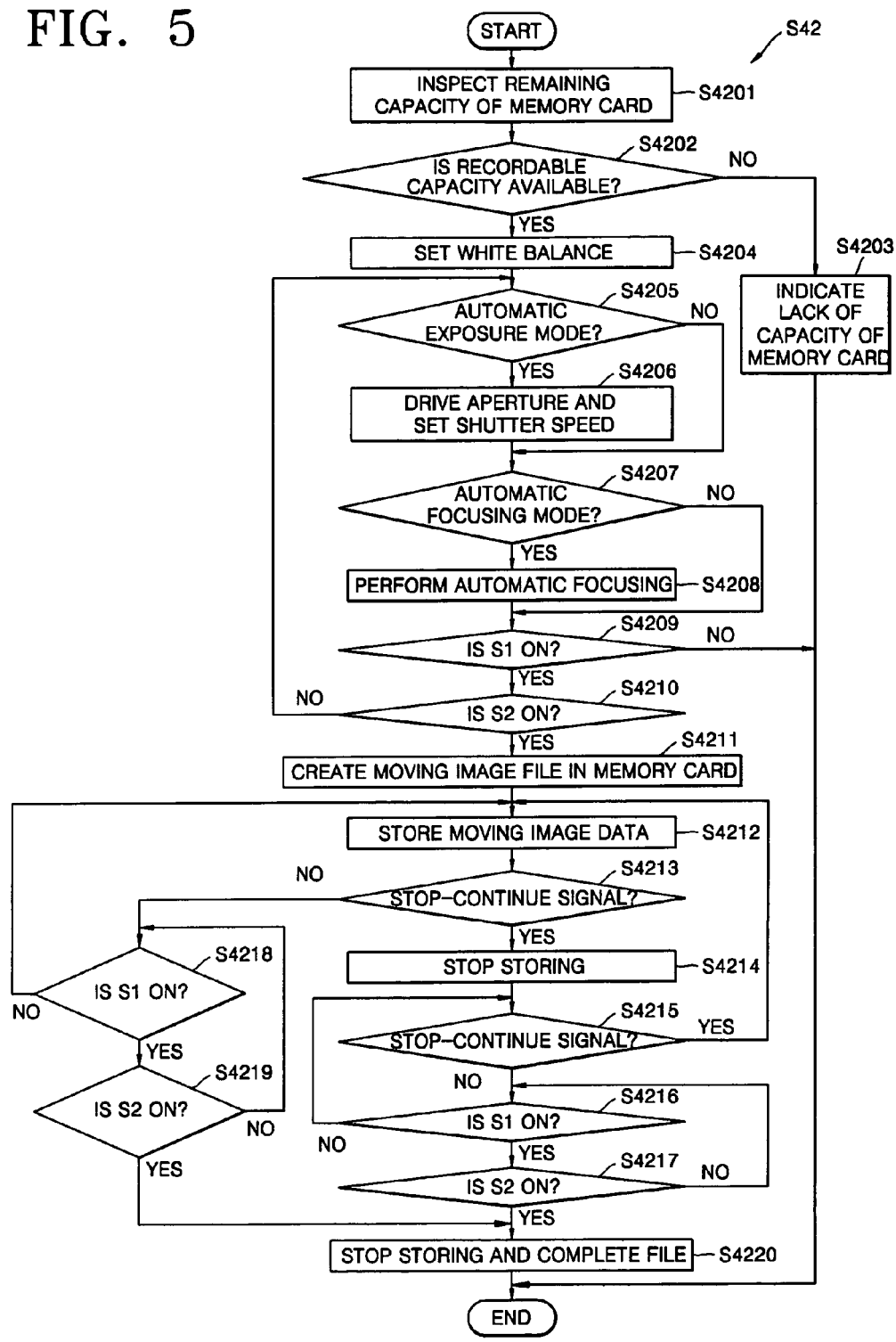
FIG. 5 is a flow chart illustrating an algorithm of performing a moving image photographing mode of FIG. 4.
Figure 6:
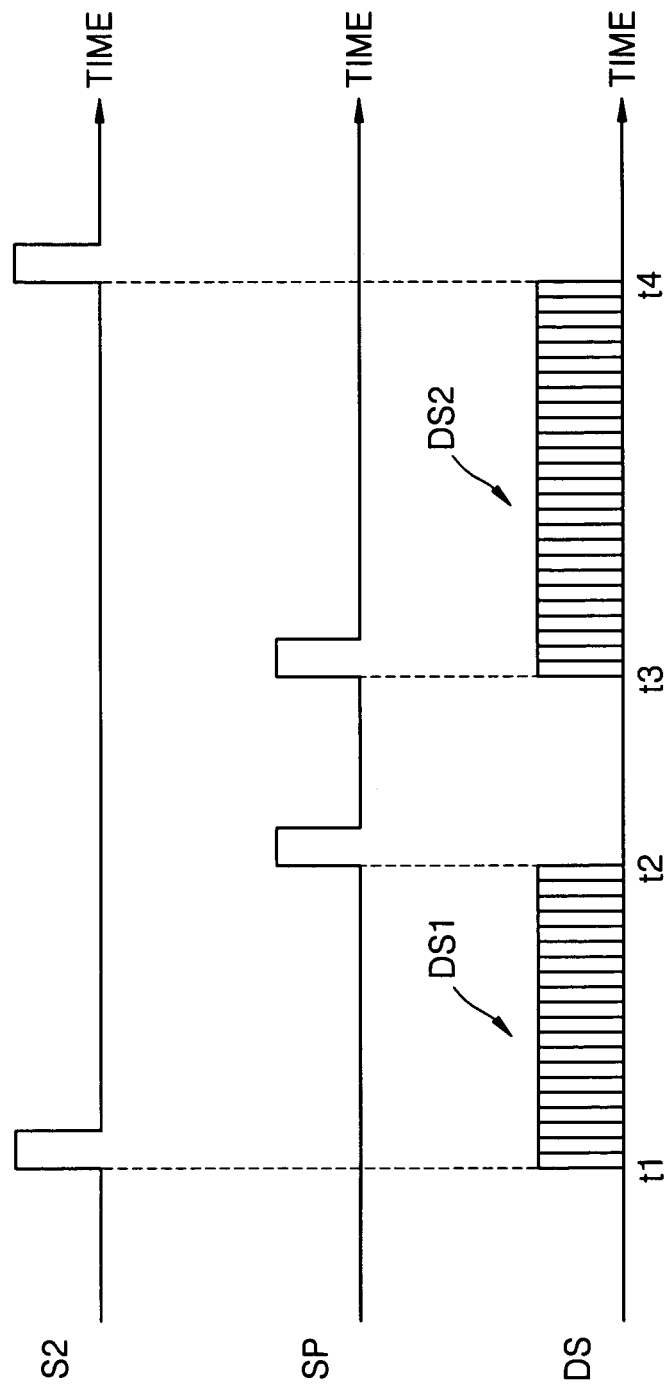
FIG. 6 is a timing diagram illustrating a first example of performing Steps 4210 through 4219 of FIG. 5.

FIG. 6 illustrates a first example of performing Steps S4210 through S4219 of FIG. 5.

Referring to FIG. 6, reference numerals S2, SP, and DS indicate a second level signal from the shutter release button 13 of FIG. 1, the macro/move-down/stop-continue button $15_P$ of FIG. 2, and moving image data stored in a memory card, respectively.

Referring to FIGS. 5 and 6, when the second level signal S2 from the shutter release button 13 is on at time t1 (Step S4210), one moving image file is created in the memory card (Step S4211), and first moving image data DS1 is stored in the moving image file (Step S4212). When a stop-continue signal is generated by the macro/move down/stop-continue button $15_P$ at time t2 (Step S4213), the first moving image data DS1 stops being stored (Step S4214). When the stop-continue signal is generated again by the macro/move-down/stop-continue button $15_P$ at a time t3 (Step S4215), second moving image data DS2 is stored in the same moving image file (Step S4212). When the second level signal S2 from the shutter release button 13 is on at time t4, the second moving image data DS2 being input stops being stored, and the moving image file is completed (Steps S4219 and S4220).

Figure 6A:
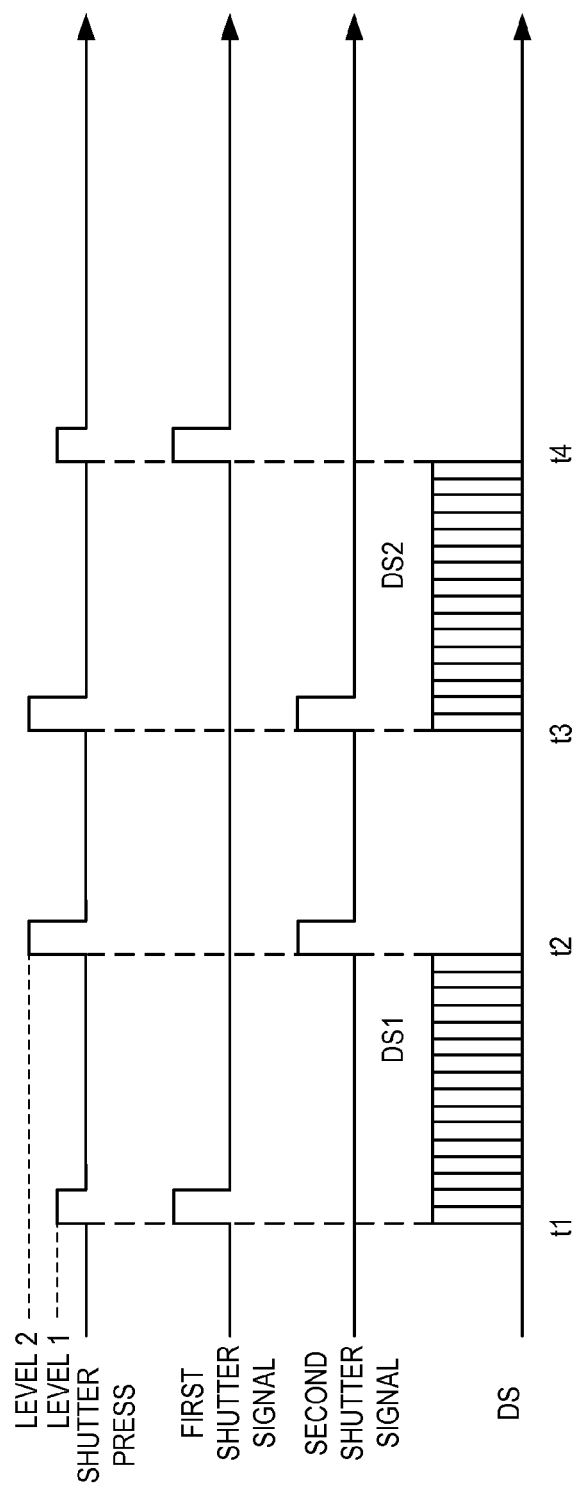
FIG. 6A is a timing diagram illustrating another example of performing Steps 4210 through 4219.

FIG. 6A is a timing diagram similar to that of FIG. 6 showing a two-level shutter button supplying a first shutter signal when pressed to a first level and a second shutter signal when pressed to a second level. The first signal is generated by a first activation of the first shutter signal, the fourth signal is generated by the second activation of the first shutter signal, the second signal is generated by a first activation of the second shutter signal and the third signal is generated by the second activation of the second shutter signal.

Figure 7:
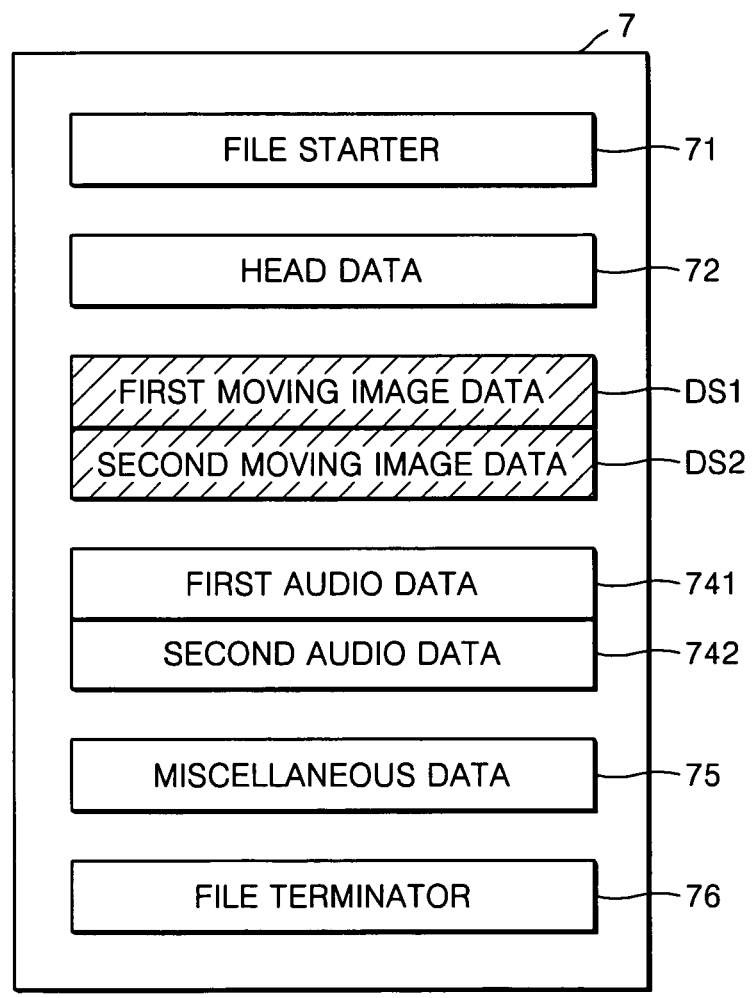
FIG. 7 is a block diagram of the structure of a moving image file obtained from the first example of FIG. 6.

Referring to FIG. 7, the moving image file 7 obtained from the first example of FIG. 6 includes a file starter 71, head data 72, the first moving image data DS1, the second moving image data DS2, a first audio data 741, a second audio data 742, miscellaneous data 75, and a file terminator 76. The file starter 71 includes data notifying a file start. The head data 72 includes data notifying a file format.

Both the first moving image data DS1 and the second moving image data DS2, divided into different time frames at a user's choice, are stored in the same moving image file 7. Accordingly, moving images photographed at different times can be consecutively reproduced. Furthermore, the first audio data 741 corresponding to the first moving image data DS1 and the second audio data 742 corresponding to the second moving image data DS2 are stored in the same moving image file 7. Here, the first audio data 741 and the second audio data 742 might not be stored in the moving image file 7 depending on moving image photographing conditions set by a user. The miscellaneous data 75 may include subtitle data at a user's choice.

Figure 8:
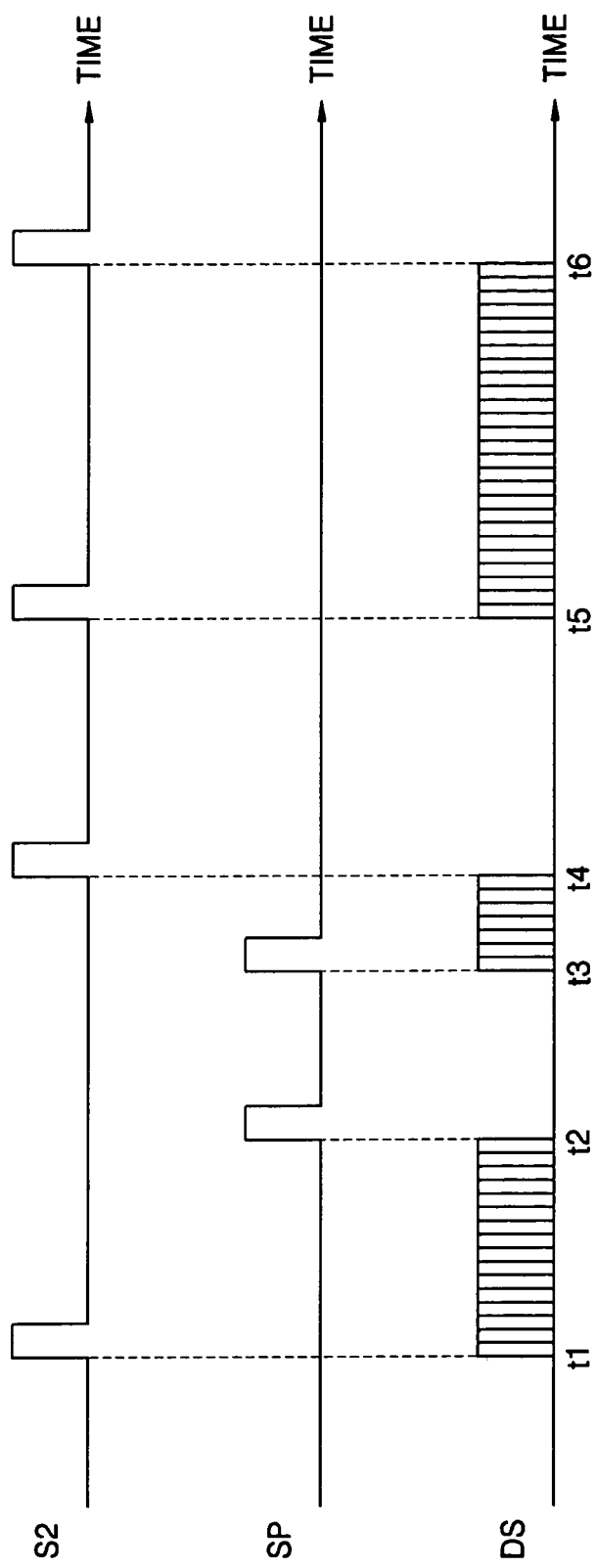
FIG. 8 is a timing diagram illustrating a second example of performing Steps 4210 through 4219.

FIG. 8 is a timing diagram illustrating a second example of performing Steps S4210 through S4219. Reference numerals of FIG. 8 that are identical to those of FIG. 6 indicate identical elements with identical functionalities.

Referring to FIGS. 5 and 8, when a second level signal S2 from the shutter release button 13 is on at time t1 (Step S4210), a first moving image file is created in a memory card (Step S4211), and first moving image data DS1 is stored in the first moving image file (Step S4212). When the stop-continue signal is generated by the macro/move-down/stop-continue button $15_P$ at time t2 (Step S4213), the first moving image data DS1 stops being stored (Step S4214). When the stop-continue signal is generated again by the macro/move-down/stop-continue button $15_P$ at time t3 (Step S4215), second moving image data DS2 is stored in the first moving image file (Step S4212). When the second level signal S2 from the shutter release button 13 is on at time t4, the second moving image data DS2 being input stops being stored, and the first moving image file is completed (Steps S4219 and S4220).

When the second level signal S2 from the shutter release button 13 is on at time t5 (Step 4210), a second moving image file is created in the memory card (Step S4211), and moving image data is stored in the second moving image file (Step S4212). When the second level signal S2 from the shutter release button 13 is on at time t6, the moving image data being input stops being stored, and the second moving image file is completed (Steps S4219 and S4220).

Figure 9:
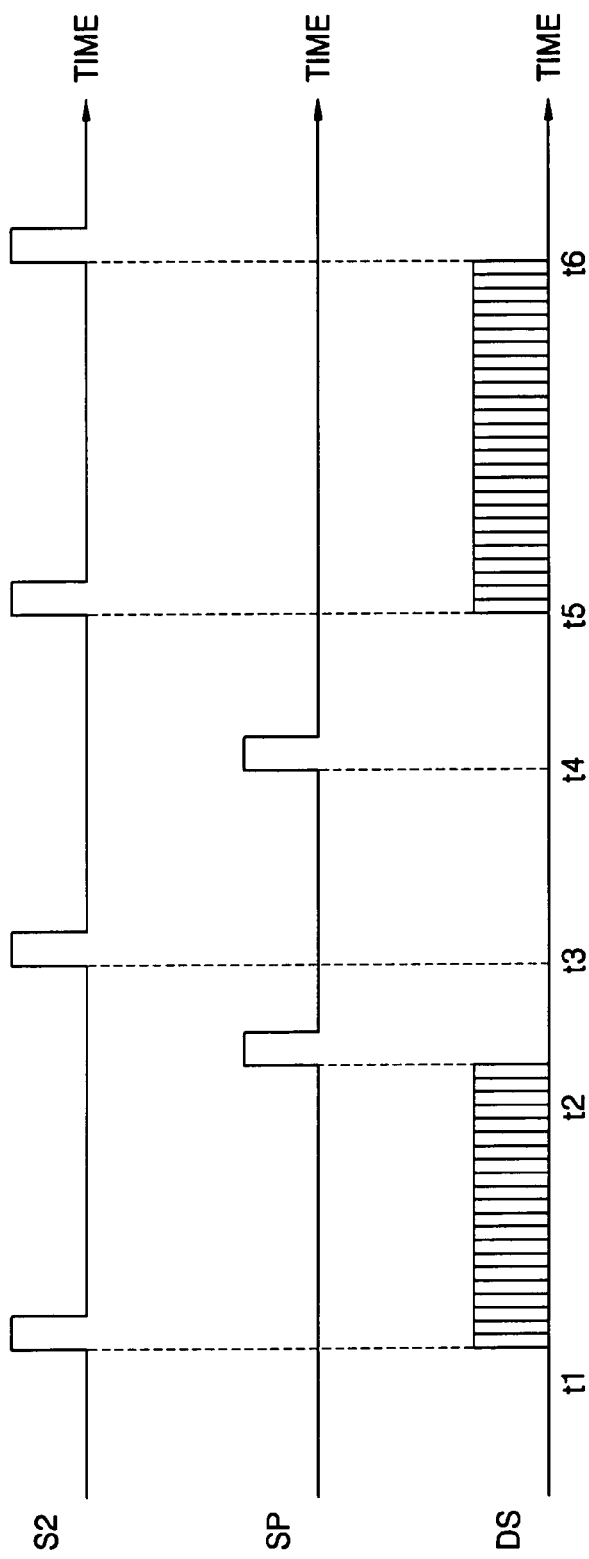
FIG. 9 is a timing diagram illustrating a third example of performing Steps 4210 through 4219.

FIG. 9 is a timing diagram illustrating a third example of performing Steps S4210 through S4219. Reference numerals of FIG. 9 that are identical to those of FIG. 6 indicate identical elements with identical functionalities.

Referring to FIGS. 5 and 9, when a second level signal S2 from the shutter release button 13 is on at time t1 (Step S4210), a first moving image file is created in a memory card (Step S4211), and moving image data is stored in the first moving image file (Step S4212). When the stop-continue signal is generated by the macro/move-down/stop-continue button $15_P$ at time t2 (Step S4213), the moving image data stops being stored (Step S4214). When the second level signal S2 from the shutter release button 13 is on at time t3, the moving image data being input stops being stored, and the first moving image file is completed (Steps S4215 through S4217 and Step S4220).

At time t4, when the moving image photographing mode is off, even though the stop-continue signal is generated by the macro/move down/stop-continue button $15_P$ (not shown in FIG. 5), photographing moving images is not performed.

When the second level signal S2 from the shutter release button 13 is on at time t5 (Step S4210), a second moving image file is created in the memory card (Step S4211), and moving image data is stored in the second moving image file (Step S4212). When the second level signal S2 from the shutter release button 13 is on at time t6, the moving image data being input stops being stored, and the second moving image file is completed (Steps S4219 and S4220).

The algorithm of performing the preview mode Step 2 of FIG. 4 will now be described with reference to FIG. 1 through 3 and FIG. 10.

The DSP 507 performs automatic white balancing (AWB) and sets parameters related to the white balance (Step S201). In the automatic exposure mode (Step S202), the DSP 507 calculates the exposure to incident luminance, drives the aperture driving motor $M_A$ according to the calculated exposure, and sets a shutter speed (Step S203).

The DSP 507 performs gamma correction on input image data (Step S204) and scales the gamma corrected image data to meet display standards. The DSP 507 converts the scaled input image data from a red R—green G—blue B format into a luminance-chromaticity format (Step S206). The DSP 507 processes the input image data depending on resolution and displayed location, and filters the input image data (Step S207).

The DSP 507 temporarily stores the input image data in the DRAM 504 of FIG. 3 (Step S208). The DSP 507 synthesizes the data temporarily stored in the DRAM 504 of FIG. 3 and on-screen display (OSD) data (Step S209). The DSP 507 converts the synthesized image data from the R-G-B format into the luminance-chromaticity format (Step S210) and outputs the image data in the converted format on the LCD driver 514 of FIG. 3 (Step S211).

Figure 4:
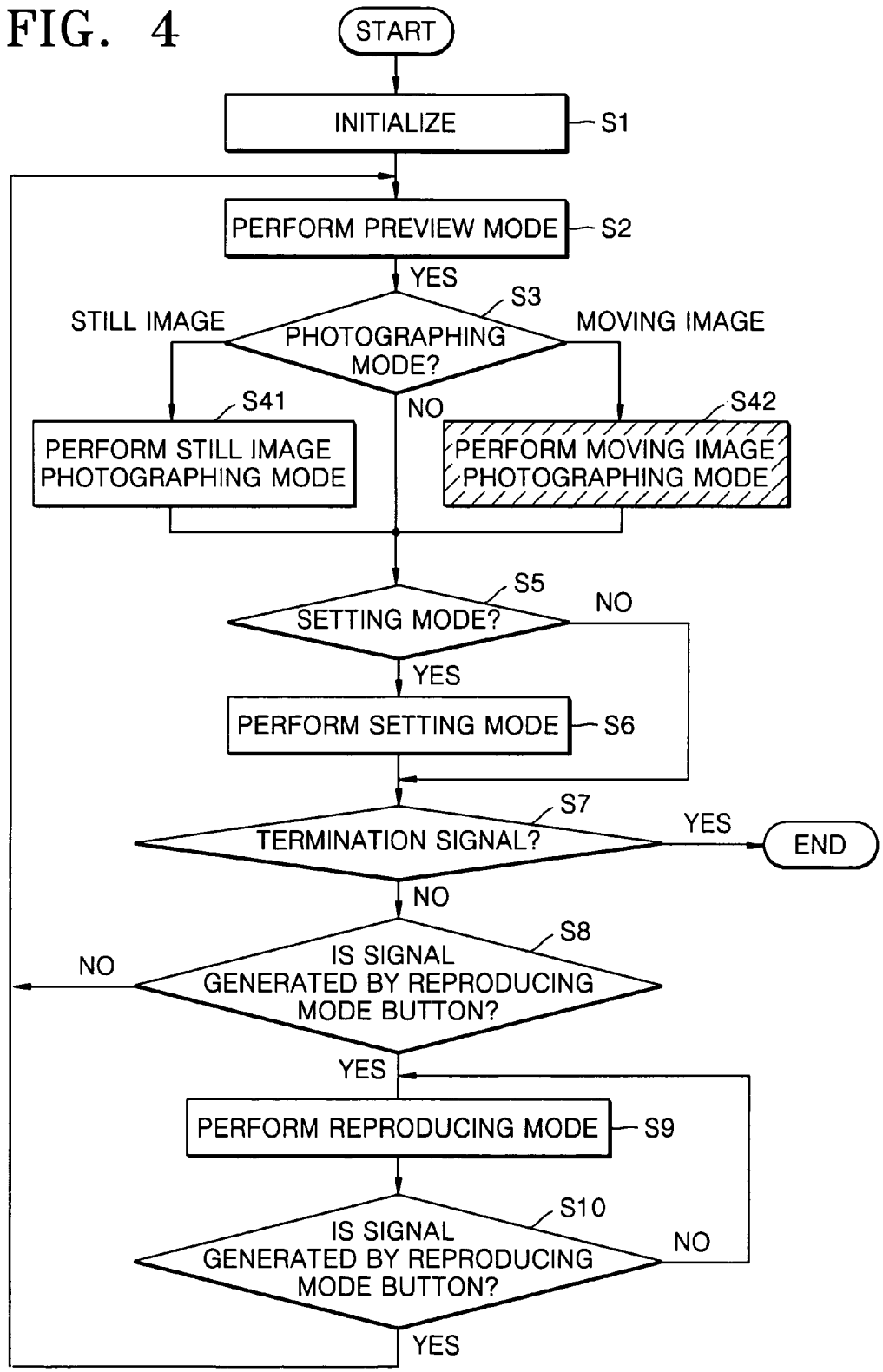
FIG. 4 is a flow chart illustrating a main algorithm of a digital signal processor of FIG. 3.
Figure 11:
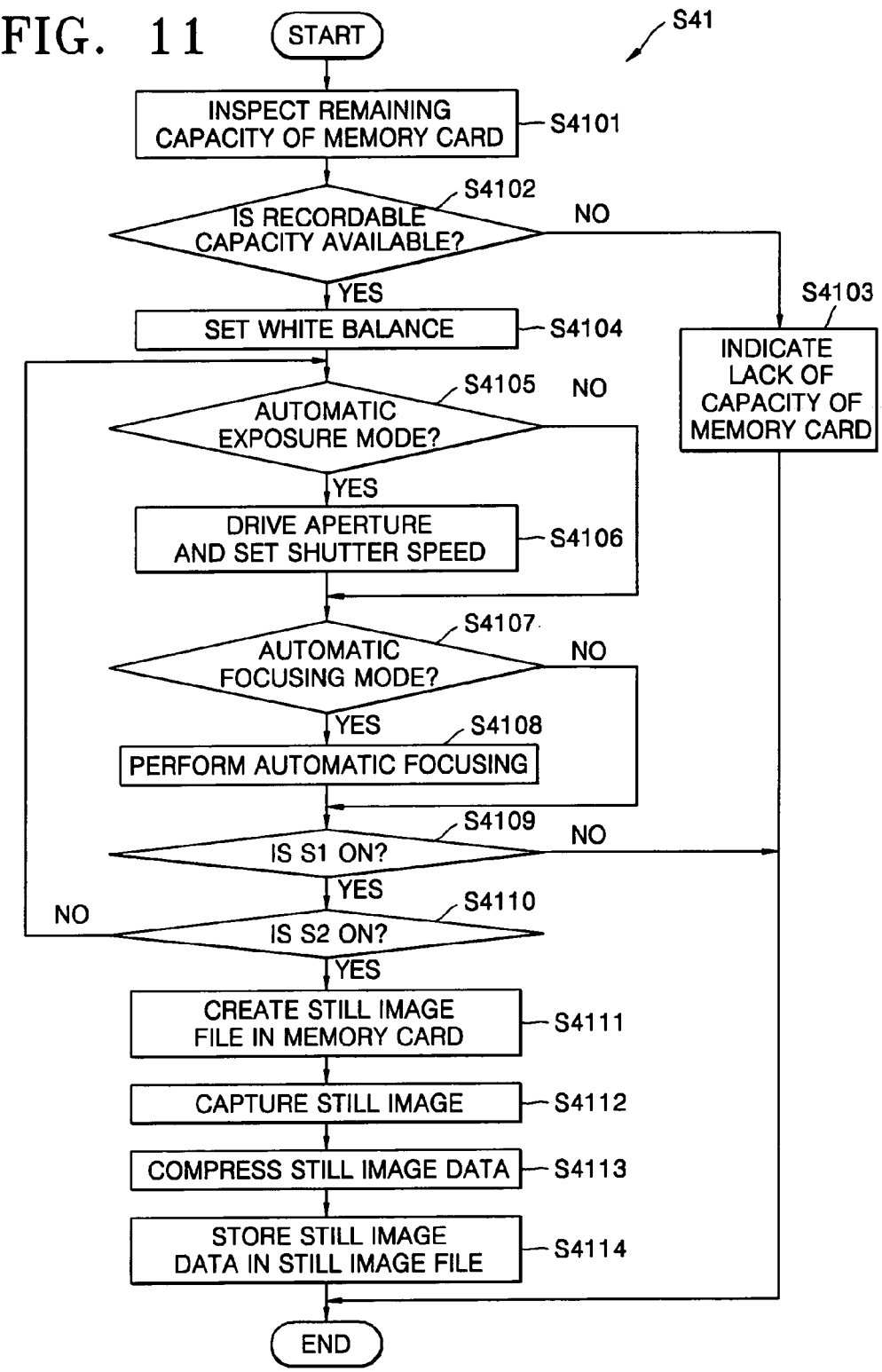
FIG. 11 is a flow chart illustrating an algorithm of performing a still image photographing mode of FIG. 4.

FIG. 11 illustrates an algorithm of performing the still image photographing mode of FIG. 4 (Step S41). The algorithm of performing the still image photographing mode (Step S41) will now be described with reference to FIGS. 1 through 3 and FIG. 11. Here, the present position of the zoom lens is already set.

The DSP 507 inspects a remaining capacity of the memory card (Step S4101) and determines whether the memory card has enough capacity for recording a digital image signal (Step S4102). When the memory card does not have enough recordable capacity, the DSP 507 indicates a lack of capacity of the memory card and stops performing the still image photographing mode (Step S4103). When the memory card has enough recordable capacity, the following steps are performed.

The DSP 507 sets while balance according to a present photographing condition, and parameters related to the white balance (Step S4104). In the automatic exposure mode (Step S4105), the DSP 507 calculates the exposure to incident luminance, drives the aperture driving motor $M_A$ according to the calculated exposure, and sets a shutter speed (Step S4106). In the automatic focusing mode (Step S4107), the DSP 507 performs automatic focusing and drives the focus lens (Step S4108).

When the first level signal S1 from the shutter release button 13 is on (Step S4109), the DSP 507 continues to perform the following steps.

The DSP 507 identifies whether the second level signal S2 is on (Step S4110). When the second level signal S2 is not on, it means that the user did not press the shutter release button 13 to the second level to take a photograph. Then, the DSP 507 re-performs Steps S4105 through S4110. When the second level signal S2 is on, it means that the user pressed the shutter release button 13 to the second level. Then, the DSP 507 creates a still image file in the memory card (Step S4111). The DSP 507 captures a still image (Step S4112). In doing so, the DSP 507 receives still image data from the CDS-ADC 501. Then, the DSP 507 compresses the received still image data (Step S4113). The DSP 507 stores the compressed still image data in the still image file (Step S4114).

As described above, in a method of controlling a digital photographing apparatus and a digital photographing apparatus adopting the same according to the present invention, signals generated by two buttons are used, and moving image data divided into different time frames at a user's choice can be consecutively reproduced.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of recording moving image data, the method comprising:
    operating a digital photographing apparatus to capture a moving image and create moving image data representative thereof;
    creating a moving image file in a recording medium;
    storing the moving image data in the moving image file as the moving image is being captured and the moving image data is being created, when a first primary signal is generated;
    stopping the digital photographing apparatus from capturing the moving image, and stopping storing of the moving image data in the moving image file, if moving image data is being stored, when a first secondary signal is generated;
    operating the digital photographing apparatus to further capture a moving image and create further moving image data representative thereof; and
    storing the further moving image data in the moving image file, as the moving image is being further captured and the further moving image data is being created, if moving image data is not being stored and a second primary signal has not been generated, when a second secondary signal is generated; and
    stopping storing of the further moving image data and completing the moving image file including the moving image data and the further moving image data, wherein the moving image data and the further moving image data are divided into different time frames, when the second primary signal is generated;
wherein:
    the first and second primary signals are each generated when only a first button is pressed and the first and second secondary signals are each generated when only a second button is pressed; and
    the moving image file comprises a file starter, head data, at least one portion of moving image data, and a file terminator.

2. The method of claim 1, further comprising:
    repeating at least once the step of stopping the digital photographing apparatus from capturing the moving image, and stopping storing of the moving image data being input in the moving image file, if moving image data is being stored, when a third secondary signal is generated.

3. The method of claim 1, further comprising:
    repeating at least once the step of storing the further moving image data in the moving image file, if moving image data is not being stored and a second primary signal has not been generated, when a fourth secondary signal is generated.

4. The method of claim 1, further comprising:
    storing audio data corresponding to the moving data in the moving image file.

5. The method of claim 1, further comprising:
    storing audio data corresponding to the moving image data being input in the moving image file, when the first primary signal is generated;
    stopping storing of the audio data corresponding to the moving image data being input in the moving image file, if moving image data is being stored, when the first secondary signal is generated;
    storing further audio data corresponding to the further moving image data in the moving image file, if moving image data is not being stored and the second primary signal has not been generated, when the second secondary signal is generated; and stopping storing of the further audio data corresponding to the further moving image data being stored and completing the moving image file when the second primary signal is generated.

6. The method of claim 1, wherein the moving image file further comprises at least one portion of audio data corresponding to the moving image data.

7. The method of claim 1, wherein the moving image file further comprises subtitle data.

8. The method of claim 1, further comprising:
determining the remaining capacity of the recording medium.

9. The method of claim 8, further comprising:
determining whether the remaining capacity of the recording medium is sufficient for recording.

10. The method of claim 1, wherein the recording medium is insertable into and removable from the digital photographing apparatus.

11. The method of claim 10, wherein the recording medium is a memory card.

12. The method of claim 1, wherein the first button may be pressed to two levels, wherein pressing the first button to the first level generates a first level signal and pressing the first button to the second level generates the first and second primary signals.

13. A digital photographing apparatus, comprising:
an optical system;
a photoelectric conversion unit;
a recording medium;
a digital signal processor;
a first button; and
a second button,
wherein the digital photographing apparatus operates to capture a moving image and create moving image data representative thereof, and wherein the digital signal processor controls the steps of:
creating a moving image file in a recording medium;
storing the moving image data in the moving image file as the moving image is being captured and the moving image data is being created, when a first primary signal is generated;
stopping the digital photographing apparatus from capturing the moving image, and stopping storing of the moving image data in the moving image file, if moving image data is being stored, when a first secondary signal is generated;
operating the digital photographing apparatus to further capture a moving image and create further moving image data representative thereof;
storing the further moving image data in the moving image file, as the moving image is being further captured and the further moving image data is being created, if moving image data is not being stored and a second primary signal has not been generated, when a second secondary signal is generated; and
stopping storing of the further moving image data and completing the moving image file including the moving image data and the further moving image data, wherein the moving image data and the further moving image data are divided into different time frames, when the second primary signal is generated;
wherein:
the first and second primary signals are each generated when only a first button is pressed and the first and second secondary signals are each generated when only a second button is pressed; and
the moving image file comprises a file starter, head data, at least one portion of moving image data, and a file terminator.

14. The digital photographing apparatus of claim 13, wherein the recording medium is insertable into and removable from the digital photographing apparatus.

15. The digital photographing apparatus of claim 13, wherein the digital signal processor further controls storing audio data corresponding to the moving image data in the moving image file.

16. A digital photographing apparatus, comprising:
means for inputting and processing light;
means for converting the processed light into an electrical digital signal representing moving image data; and
means for performing the following operations:
creating a moving image file in a recording medium;
storing the moving image data in the moving image file as the processed light is being converted into the electrical digital signal representing the moving image data, when a first primary signal is generated;
stopping inputting and processing light and converting the processed light, while stopping storing of the moving image data in the moving image file, if moving image data is being stored, when a first secondary signal is generated;
continuing inputting and processing light and converting the processed light, and storing further moving image data in the moving image file as the processed light is being converted into the electrical digital signal representing the moving image data, if moving image data is not being stored and a second primary signal has not been generated, when a second secondary signal is generated; and
stopping storing of the further moving image data and completing the moving image file including the moving image data and the further moving image data, wherein the moving image data and the further moving image data are divided into different time frames, when the second primary signal is generated;
wherein:
the first and second primary signals are each generated when only a first button is pressed and the first and second secondary signals are each generated when only a second button is pressed; and
the moving image file comprises a file starter, head data, at least one portion of moving image data, and a file terminator.

17. A method of recording time-variant digital information comprising:
using a digital information receiving apparatus to capture a moving image as time-variant digital information;
upon receiving a first signal, creating a digital information file and storing the time-variant digital information as the moving image is being captured;
upon receiving a second signal, pausing capturing of the moving image and the storing of the time-variant digital information;
upon receiving a third signal, continuing capturing of a further moving image as further time-variant digital information and storing the further time-variant digital information in the same digital information file such that at least two separate time-variant digital information time frames are contiguously stored in the same digital information file as the further moving image is being captured; and upon receiving a fourth signal, stopping storage of the further time-variant digital information and completing the digital information file;
wherein:
the first and fourth signals are each generated when only a first button is pressed, the second and third signals are each generated when only a second button is pressed, wherein the first signal is generated by a first activation of the first button and the fourth signal is generated by a second activation of the first button, the second signal is generated by a first activation of the second button, and the third signal is generated by the second activation of the second button; and
the moving image file comprises a file starter, head data, at least one portion of moving image data, and a file terminator.

18. The method of claim 17 wherein the first button is a shutter button.

19. A method of recording time-variant digital information comprising:
using a digital information receiving apparatus to capture a moving image as time-variant digital information;
upon receiving a first signal, creating a digital information file and storing the time-variant digital information as the moving image is being captured;
upon receiving a second signal, pausing capturing of the moving image and the storing of the time-variant digital information;
upon receiving a third signal, continuing capturing of a further moving image as further time-variant digital information and storing the further time-variant digital information in the same digital information file such that at least two separate time-variant digital information time frames are contiguously stored in the same digital information file as the further moving image is being captured; and
upon receiving a fourth signal, stopping storage of the further time-variant digital information and completing the digital information tile;
wherein:
the first and fourth signals are each generated when only a first button is pressed;
the first button is a shutter button;
the second signal is generated by a first activation of only a switch element and the third signal is generated by a second activation of only the switch element; and
the moving image file comprises a file starter, head data, at least one portion of moving image data, and a file terminator.

20. A method of recording time-variant digital information comprising:
using a digital information receiving apparatus to capture a moving image as time-variant digital information;
upon receiving a first signal, creating a digital information file and storing the time-variant digital information as the moving image is being captured;
upon receiving a second signal, pausing capturing of the moving image and the storing of the time-variant digital information;
upon receiving a third signal, continuing capturing of a further moving image as further time-variant digital information and storing the further time-variant digital information in the same digital information file such that at least two separate time-variant digital information time frames are contiguously stored in the same digital information file as the further moving image is being captured; and
upon receiving a fourth signal, stopping storage of the further time-variant digital information and completing the digital information file;
wherein:
the first signal is generated by only a first activation of a shutter button, and the fourth signal is generated by only a second activation of the shutter button; and
a first switch element and a second switch element is provided where the second signal is generated by the first switch element and the third signal is generated by the second switch element; and
the moving image file comprises a file starter, head data, at least one portion of moving image data, and a file terminator.

21. A method of recording time-variant digital information comprising:
using a digital information receiving apparatus to capture a moving image as time-variant digital information;
upon receiving a first signal, creating a digital information file and storing the time-variant digital information as the moving image is being captured;
upon receiving a second signal, pausing capturing of the moving image and the storing of the time-variant digital information;
upon receiving a third signal, continuing capturing of a further moving image as further time-variant digital information and storing the further time-variant digital information in the same digital information file such that at least two separate time-variant digital information time frames are contiguously stored in the same digital information file as the further moving image is being captured; and
upon receiving a fourth signal, stopping storage of the further time-variant digital information and completing the digital information file;
wherein:
a two-level shutter button is provided that supplies a first shutter signal when pressed to a first level and supplies a second shutter signal when pressed to a second level, where the first signal is generated by a first activation of the first shutter signal, the fourth signal is generated by the second activation of the first shutter signal, the second signal is generated by a first activation of the second shutter signal and the third signal is generated by the second activation of the second shutter signal; and
the moving image file comprises a file starter, head data, at least one portion of moving image data, and a file terminator.

* * * * *